United States Patent [19]

Nachbur et al.

[11] 3,874,911
[45] Apr. 1, 1975

[54] PROCESS FOR THE MANUFACTURE OF PHOSPHORUS-CONTAINING CONDENSATION PRODUCTS, THE PRODUCTS AND THEIR USE AS FLAMEPROOFING AGENTS

[75] Inventors: Hermann Nachbur, Dornach; Arthur Maeder, Therwil, both of Switzerland

[73] Assignee: Ciba-Geigy AG, Basel, Switzerland

[22] Filed: Aug. 31, 1972

[21] Appl. No.: 285,170

[30] Foreign Application Priority Data
Jan. 14, 1972 Switzerland.......................... 520/72

[52] U.S. Cl.... 117/136, 117/138.8 F, 117/139.5 A, 117/143 A, 260/606 SP
[51] Int. Cl................................................ C09d 1/00
[58] Field of Search...... 117/136, 138.8 F, 139.5 A, 117/143 A; 260/606.5 P

[56] References Cited
UNITED STATES PATENTS

| | | | |
|---|---|---|---|
| 3,276,897 | 10/1966 | Reeves et al...................... | 117/62.2 |
| 3,421,923 | 1/1969 | Guth.............................. | 117/136 X |
| 3,428,480 | 2/1969 | Wagner et al. ..................... | 117/136 |
| 3,669,725 | 6/1972 | Nachbur et al..................... | 117/136 |
| 3,681,124 | 8/1972 | Sello et al........................... | 117/136 |
| 3,690,941 | 9/1972 | Reuter et al....................... | 117/136 |

FOREIGN PATENTS OR APPLICATIONS
884,785  12/1961  United Kingdom

*Primary Examiner*—Michael R. Lusignan
*Attorney, Agent, or Firm*—Joseph G. Kolodny; Edward McC. Roberts; Prabodh I. Almaula

[57] ABSTRACT

The subject of the invention is a process for the manufacture of water-soluble condensation products of hydroxymethyl-phosphonium compounds and amides or carbamates, characterised in that (a) one mol of a tetrakis-(hydroxymethyl)-phosphonium compound is condensed with (b) 0.02 to 1 mol, preferably 0.1 to 0.6 mol, of an optionally methylolated compound of the formula

R—CONH$_2$ 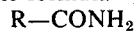 (1)

wherein R denotes alkoxy with 1 to 4 carbon atoms, hydroxyalkoxy with 2 to 4 carbon atoms, aminocarbonyl or a radical of the formula (H$_2$N — CO — CH$_2$CH$_2$)$_2$ — Z — CH$_2$CH$_2$ — 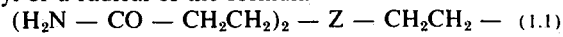 (1.1)

wherein Z represents

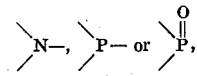

at 40° to 120°C, optionally in the presence of formaldehyde or a formaldehyde-donating agent and optionally in the presence of an inert organic solvent, optionally subsequently further condensed at temperatures of 100° to 150°C, and if appropriate free hydroxyl groups are at least partially etherified with at least one alkanol with 1 to 4 carbon atoms and if appropriate the salts of the condensation products are converted into the corresponding hydroxides.

The condensation products are used for flameproofing organic fibre material, especially textiles.

17 Claims, No Drawings

PROCESS FOR THE MANUFACTURE OF PHOSPHORUS-CONTAINING CONDENSATION PRODUCTS, THE PRODUCTS AND THEIR USE AS FLAMEPROOFING AGENTS

The subject of the invention is a process for the manufacture of water-soluble condensation products of hydroxymethyl-phosphonium compounds and amides or carbamates, characterised in that (a) one mol of a tetrakis-(hydroxymethyl)-phosphonium compound is condensed with (b) 0.02 to 1 mol, preferably 0.1 to 0.6 mol, of an optionally methylolated compound of the formula $$R—CONH_2 \qquad (1)$$

wherein R denotes alkoxy with 1 to 4 carbon atoms, hydroxyalkoxy with 2 to 4 carbon atoms, aminocarbonyl or a radical of the formula $$(H_2N — CO — CH_2CH_2)_2 — Z — CH_2CH_2 — \qquad (1.1)$$

wherein Z represents $$\diagdown N—, \diagdown P— \text{ or } \diagdown \overset{O}{\underset{\|}{P}},$$

at 40° to 120°C, optionally in the presence of formaldehyde or a formaldehyde-donating agent and optionally in the presence of an inert organic solvent, optionally subsequently further condensed at temperatures of 100° to 150° C, and if appropriate free hydroxyl groups are at least partially etherified with at least one alkanol with 1 to 4 carbon atoms and if appropriate the salts of the condensation products are converted into the corresponding hydroxides.

The condensation is preferably carried out at 70° to 110° C in an inert organic solvent or solvent mixture. For this, aromatic hydrocarbons are above all suitable, such as, for example, toluene, o-, m- or p-xylene or a mixture thereof, or xylene-toluene, xylene-benzene or xylene-decahydronaphthalene mixtures. Preferably, the further condensation which may follow is carried out at 125° to 140° C or especially about 135° C, that is to say the boiling point of the solvent or solvent mixture.

At the same time it is however also possible to carry out the condensation in the absence of an inert organic solvent, for example if condensation product already manufactured is used as the solvent or if condensation is carried out in the melt.

An appropriate procedure is to heat the tetrakis-(hydroxymethyl)-phosphonium compound, which as a rule is present as an aqueous solution, to the boil together with the component (b), optionally in a solvent, and to distil off the water. Possible tetrakis-(hydroxymethyl)-phosphonium compounds are above all salts and the hydroxide.

Amongst the tetrakis-(hydroxymethyl)-phosphonium salts used, the halides, such as, for example, the bromide or especially the chloride, are preferred. Tetrakis-(hydroxymethyl)-phosphonium chloride is hereafter referred to as THPC.

Where tetrakis-(hydroxymethyl)-phosphonium hydroxide (THPOH) is used as the starting product, it is appropriately prepared beforehand from a corresponding salt, for example THPC, by neutralisation in aqueous solution with a base, for example sodium hydroxide, and subsequent dehydration.

Preferred compounds of the formula (1) correspond to the formula $$R_1 — CONH_2 \qquad (2)$$

wherein $R_1$ denotes alkoxy with 1 to 4 carbon atoms, hydroxyalkoxy with 2 to 4 carbon atoms or aminocarbonyl.

Amongst these, compounds of particular interest are those of the formula $$R_2 — CONH_2 \qquad (3)$$

wherein $R_2$ denotes methoxy, ethoxy, 2-hydroxyethoxy or aminocarbonyl.

Suitable representatives amongst the compounds of the formulae (1) to (3) are, for example, methylcarbamate, ethylcarbamate, hydroxyethylcarbamate of oxalic acid diamide and also the compounds of the formulae (4.1) $\quad (H_2N — CO — CH_2CH_2)_2 — N — CH_2CH_2 — CONH_2$ (4.2) $\quad (H_2N — CO — CH_2CH_2)_2 — P — CH_2CH_2 — CONH_2$ (4.3) $\quad (H_2N—CO—CH_2CH_2)_2—\underset{\underset{O}{\|}}{P}—CH_2CH_2—CONH_2$ The compounds of the formula (1) to (4.3) can be used either in the methylolated or in the non-methylolated form.

The formaldehyde which is optionally used conjointly in the manufacture of the phosphorus-containing condensation products is preferably in the form of an aqueous solution. A possible formaldehyde-donating agent is above all paraformaldehyde.

The etherification, which may have to be carried out, of the condensation product which still contains free hydroxyl groups is effected, for example, with n-butanol, n-propanol, ethanol or especially methanol. Preferably, the reaction is carried out in an acid medium.

The acid catalysts optionally used conjointly in the condensation are preferably salts which have an acid action (Lewis acids), such as magnesium chloride, iron-III chloride, zinc nitrate or boron trifluoride/-diethyl ether. The conjoint use of these catalysts is especially advisable in the condensation of THPOH.

After completion of the condensation and optional etherification, the salts of the condensation products can also be completely or partially converted into their corresponding hydroxides, which is as a rule effected by adding strong bases such as alkali metal hydroxides or alkaline earth metal hydroxides, for example sodium hydroxide, potassium hydroxide or calcium hydroxide, or also sodium carbonate. The amount of base is appropriately so chosen that the pH value of the reaction mixture is about 5 to 8. Appropriately, this conversion is carried out in the bath used for application.

At times, the end products show an unpleasant odour caused by volatile, low molecular trivalent phosphorus compounds, for example phosphines, such as trihydroxymethylphosphine. This odour can be eliminated by an oxidative after-treatment of the condensation product, for example by passing air or oxygen into the reaction mixture or by adding oxidising agents such as hydrogen peroxide or potassium persulphate.

The condensation products are used for flameproofing organic fibre material, especially textiles. For this, an appropriate procedure is to apply to these materials an aqueous preparation which contains at least (1) a condensation product of the indicated type and (2) a polyfunctional compound which differs from the condensation products according to (1), and to finish the materials treated in this way by the wet batch, moist batch or especially by the ammonia or, preferably, thermo fixing process.

The component (2) is preferably a polyfunctional epoxide or above all a polyfunctional nitrogen compound. Possible epoxides are above all epoxides which are liquid at room temperature and have at least two epoxide groups, which are preferably derived from polyhydric phenols. Polyfunctional nitrogen compounds are, for example, polyalkylenepolyamines or especially compounds which form aminoplasts, or aminoplast precondensates; the latter are preferred.

By compounds which form aminoplasts there are understood nitrogen compounds which can be methylolated and by aminoplast precondensates there are understood addition products of formaldehyde to nitrogen compounds which can be methylolated. As compounds which form aminoplasts or as nitrogen compounds which can be methylolated, there may be mentioned:

1,3,5-aminotriazines such as N-substituted melamines, for example N-butylmelamine, N-trihalogenomethylmelamines, triazones and ammeline, guanamines, for example benzoguanamines and acetoguanamines, or also diguanamines.

Further possibilities are: cyanamide, acrylamide, alkylurea or arylurea and alkylthioureas or arylthioureas, alkyleneureas or alkylenediureas, for example, urea, thiourea, urones, ethyleneurea, propyleneurea, acetylenediurea or especially 4,5-dihydroxyimidazolidone-2 and derivatives thereof, for example 4,5-dihydroxyimidazolidone-2 substituted in the 4-position, at the hydroxyl group, by the radical —$CH_2CH_2CO-NH-CH_2OH$. The methylol compounds of a urea, of an ethyleneurea or, especially, of melamine are preferentially used. Valuable products are in general given by products which are as highly methylolated as possible but in particular also by products with low methylolation, such as etherified or non-etherified methylolmelamines, for example dimethylolmelamine or trimethylolmelamine or mixtures thereof. Suitable aminoplast precondensates are both predominantly monomolecular aminoplasts and also more highly precondensed aminoplasts.

The ethers of these aminoplast precondensates can also be used together with the reaction products. For example, the ethers of alkanols such as methanol, ethanol, n-propanol isopropanol, n-butanol or pentanols are advantageous. It is, however, desirable that these aminoplast precondensates should be water-soluble, such as, for example, pentamethylolmelamine-dimethyl-ether or trimethylolmelamine-dimethyl-ether.

The organic fibre materials which are to be provided with a flameproof finish are, for example, wood, paper, furs, hides or preferably textiles. In particular, fibre materials of polyamides, cellulose, cellulose-polyester or polyester are flameproofed, fabrics of wool or polyester or above all mixed fabrics of polyester — cellulose, wherein the ratio of the polyester constituent to the cellulose constituent is 1:4 to 2:1, being preferred. It is thus possible to use, for example, so-called 20/80, 26/74, 50/50 or 67/33 polyester-cellulose mixed fabrics.

The cellulose or cellulose constituent of the fibre material originates, for example, from linen, cotton, rayon or staple viscose. In addition to polyester-cellulose fibre mixtures, fibre mixtures of cellulose with natural or synthetic polyamides can also be used. Above all, wool fibre materials can be flameproofed well with the polycondensation products.

The aqueous preparations for flameproofing the organic fibre materials as a rule contain 200 to 800 g/l, preferably 350 to 600 g/l, of the component (1) and 20 to 200 g/l, preferably 40 to 120 g/l, of the component (2). The preparations in most cases have an acid to neutral or weakly alkaline pH value.

The preparations for flameproofing can optionally contain yet further additives. To achieve a greater deposit of substance on fabrics it is advantageous, for example, to add 0.1 to 0.5 percent of a high molecular polyethylene glycol. Furthermore, the customary plasticisers can be added to the preparations, for example an aqueous polyethylene emulsion or silicone oil emulsion.

To improve the mechanical strengths of the fibres it is also possible to add to the preparations suitable copolymers, for example copolymers of N-methylolacrylamide or cationic copolymers. Advantageous compositions for this purpose are, for example, aqueous emulsions of copolymers of (a) 0.25 to 10 percent of an alkaline earth metal salt of an $\alpha,\beta$-ethylenically unsaturated monocarboxylic acid, (b) 0.25 to 30 percent of a N-methylolamide or N-methylolamide-ether of an $\alpha,\beta$-ethylenically unsaturated monocarboxylic or dicarboxylic acid and (c) 99.5 to 60 percent of at least one other copolymerisable compound. These copolymers and their manufacture are known. The tear strength and abrasion resistance of the treated fibre material can be favourably influenced by the conjoint use of such a copolymer.

If a polymer of the indicated type is also added to the preparation, it is advantageously added in small amounts, for example 1 to 10 percent relative to the amount of the condensation product. The same is true of any plasticiser which may be added, where the appropriate amounts can again be 1 to 10 percent.

It is also possible to add curing catalysts, such as, for example, ammonium chloride, ammonium dihydrogen orthophosphate, phosphoric acid. magnesium chloride or zinc nitrate, but is in most cases not necessary. The pH value of the preparations is as a rule 2 to 7.5, preferably 4 to 7, and is adjusted in the usual manner by adding acid or base.

It can also be advantageous to add buffer substances, for example $NaHCO_3$, disodium and trisodium phosphate or triethanolamine.

To improve the durability of the flameproof finishes and to achieve a soft handle it can be advantageous to add, to the aqueous preparations, halogenated paraffins in combination with a polyvinyl halide compound.

The preparations are now applied to the fibre materials, which can be done in a manner which is in itself known. Preferably, piece goods are used, and are impregnated on a padder which is fed with the preparation at room temperature.

In the preferred thermofixing process, the fibre material impregnated in this way must now be dried and subjected to a heat treatment. Drying is appropriately carried out at temperatures of up to 100° C. Thereafter the material is subjected to a heat treatment at temperatures above 100° C, preferably 100° to 200° C, preferably 120° to 180° C, the duration of which can be the shorter the higher is the temperature. This duration of heating is, for example, 30 seconds to 10 minutes.

It is, however, also possible to use the so-called moist fixing process or wet fixing process or the ammonia fixing process.

If the moist fixing process is used, the fabric is first dried to a residual moisture of about 5 to 20 percent and is thereafter stored for 12 to 48 hours at about 40° to 60° C, rinsed, washed and dried. In the wet fixing process a similar procedure is followed, except that the completely wet fibre material is stored. In the ammonia fixing process, the treated fibre material is first gas-treated with ammonia whilst moist and is subsequently dried.

A rinse with an acid-binding agent, preferably with aqueous sodium carbonate solution, can be appropriate in the case of a strongly acid reaction medium.

In the examples which follow, the percentages and parts are percentages by weight and parts by weight, respectively. The relationship of parts by volume to parts by weight is as of ml to g.

EXAMPLE 1

244 parts of a 78 percent strength aqueous THPC solution (1 mol), 22 parts of oxalic acid diamide (0.25 mol) and 200 parts of a xylene isomer mixture are heated to the boil with rapid stirring, in a stirred vessel of 500 parts by volume capacity which is equipped with a water separator and thermometer. The azeotropic removal of the water from the aqueous THPC solution starts at a boiling point of 103° C. After removing this water (53.5 parts) the boiling point of the xylene is 130° C. A further 23.5 parts of water are now removed azeotropically by additional treatment at this temperature, after which the condensation product forms a very highly viscous mass. The product is cooled to 95° C and dissolved by adding 200 parts of water, and the xylene is largely siphoned off. The aqueous solution is evaporated in vacuo at 70° C. 175 parts of a yellow, highly viscous product are obtained. The active substance content is 100 percent. The infra-red spectrum of this product shows the following bands:

| Broad | band at approx. | 3,300 | $cm^{-1}$ | strong |
|---|---|---|---|---|
| Broad | do. | 2,920 | do. | weak |
| Broad shoulder | do. | 2,860 | do. | weak |
| Broad shoulder | do. | 2,650 | do. | weak |
| Broad shoulder | do. | 2,470 | do. | weak |
| Broad shoulder | do. | 2,370 | do. | weak |
| Broad shoulder | do. | 2,080 | do. | weak |
| Broad shoulder | do. | 1,720 | do. | medium |
| Broad | do. | 1,675 | do. | weak |
| Broad shoulder | do. | 1,645 | do. | medium |
| Broad shoulder | do. | 1,500 | do. | weak-medium |
| Broad | do. | 1,415 | do. | weak-medium |
| Sharp | do. | 1,300 | do. | weak |
| Broad shoulder | do. | 1,205 | do. | weak-medium |
| Broad shoulder | do. | 1,150 | do. | weak |
| Broad shoulder | do. | 1,105 | do. | weak |
| Sharp | do. | 1,045 | do. | medium |
| Sharp shoulder | do. | 925 | do. | weak-medium |
| Broad shoulder | do. | 895 | do. | weak |
| Broad | do. | 710 | do. | weak |

EXAMPLE 2

244 parts of a 73% strength aqueous solution of THPC (1 mol of THPC) and 52.5 parts of hydroxyethylcarbamate (0.5 mol) are treated for 2 hours at 100° C internal temperature in a stirred vessel of 500 parts by volume capacity which is equipped with a thermometer and reflux condenser. Thereafter the mixture is cooled to room temperature and 296 parts of a clear, light yellow-coloured solution are obtained, containing 83 percent of active substance. The infra-red spectrum of this product shows the following bands:

| Broad | band at approx. | 3,250 | $cm^{-1}$ | strong |
|---|---|---|---|---|
| Broad shoulder | do. | 2,980 | do. | weak |
| Broad shoulder | do. | 2,920 | do. | weak |
| Broad shoulder | do. | 2,850 | do. | medium |
| Broad shoulder | do. | 2,650 | do. | medium |
| Broad shoulder | do. | 2,370 | do. | weak |
| Broad | do. | 2,080 | do. | weak |
| Broad | do. | 1,705 | do. | strong |
| Broad shoulder | do. | 1,650 | do. | medium |
| Broad | do. | 1,580 | do. | medium |
| Broad | do. | 1,420 | do. | medium |
| Broad shoulder | do. | 1,300 | do. | weak-medium |
| Broad | do. | 1,260 | do. | weak |
| Broad shoulder | do. | 1,210 | do. | weak |
| Broad | do. | 1,150 | do. | weak |
| Sharp | do. | 1,045 | do. | strong |
| Broad shoulder | do. | 900 | do. | medium |
| Broad shoulder | do. | 885 | do. | weak-medium |
| Broad shoulder | do. | 820 | do. | weak |
| Broad shoulder | do. | 770 | do. | weak |

EXAMPLE 3

244 parts of a 78% strength aqueous solution of THPC (1 mol of THPC) and 117 parts of a 57.7 percent strength aqueous solution of N-dimethylolmethylcarbamate (0.5 mol) are treated for 2 hours at 100° C internal temperature in a stirred vessel of 500 parts by volume capacity which is equipped with a thermometer and reflux condenser. Thereafter the solution is concentrated in vacuo at about 60° C.

246 parts of a colourless low viscosity product containing 97.5 percent of active substance are obtained. The infra-red spectrum of this product shows the following bands:

| Broad | band at approx. | 3,240 | $cm^{-1}$ | strong |
|---|---|---|---|---|
| Broad shoulder | do. | 2,970 | do. | weak |
| Broad | do. | 2,920 | do. | weak |
| Broad shoulder | do. | 2,850 | do. | weak-medium |
| Broad shoulder | do. | 2,650 | do. | weak-medium |
| Broad shoulder | do. | 2,480 | do. | weak |
| Broad shoulder | do. | 2,340 | do. | weak |
| Broad | do. | 2,070 | do. | weak |
| Broad | do. | 1,700 | do. | strong |
| Broad shoulder | do. | 1,650 | do. | weak-medium |
| Broad | do. | 1,525 | do. | weak-medium |
| Broad | do. | 1,410 | do. | weak-medium |
| Broad shoulder | do. | 1,300 | do. | weak-medium |
| Broad | do. | 1,260 | do. | weak |
| Broad shoulder | do. | 1,205 | do. | weak |
| Broad shoulder | do. | 1,165 | do. | weak |
| Broad shoulder | do. | 1,110 | do. | weak |
| Broad | do. | 1,045 | do. | medium |
| Broad | do. | 915 | do. | weak-medium |

-Continued

| | | | | |
|---|---|---|---|---|
| Broad shoulder | band at approx. | 820 | cm$^{-1}$ | weak |
| Broad shoulder | do. | 775 | do. | weak |

EXAMPLE 4

190.5 parts of crystalline anhydrous THPC (1 mol) and 1.76 parts (0.02 mol) of oxalic acid diamide are condensed for 2 hours in the melt at 105°–110° C, in a stirred vessel of 500 parts by volume capacity, which is equipped with a reflux condenser and thermometer. Thereafter the mixture is cooled to 50° C, 80 parts of methanol and 0.1 part of 37 percent strength aqueous hydrochloric acid are added and etherification is carried out for 30 minutes at the reflux temperature (65° C). The excess methanol is then removed in vacuo. 177 parts of a reddish-coloured condensation product of medium viscosity are obtained. The phosphorus content is 17.5 percent. The infra-red spectrum of this product shows the following bands:

| | | | | |
|---|---|---|---|---|
| Broad | band at approx. | 3,240 | cm$^{-1}$ | strong |
| Broad shoulder | do. | 2,970 | do. | weak |
| Broad | do. | 2,920 | do. | weak |
| Broad shoulder | do. | 2,850 | do. | weak-medium |
| Broad shoulder | do. | 2,650 | do. | weak-medium |
| Broad shoulder | do. | 2,460 | do. | weak |
| Broad shoulder | do. | 2,360 | do. | weak |
| Broad | do. | 2,070 | do. | weak-medium |
| Broad shoulder | do. | 1,710 | do. | weak-medium |
| Broad | do. | 1,630 | do. | medium |
| Broad | do. | 1,415 | do. | medium-strong |
| Sharp | do. | 1,300 | do. | weak-medium |
| Broad shoulder | do. | 1,265 | do. | weak |
| Broad shoulder | do. | 1,195 | do. | weak-medium |
| Broad shoulder | do. | 1,160 | do. | weak |
| Broad | do. | 1,115 | do. | weak |
| Broad | do. | 1,040 | do. | medium-strong |
| Broad shoulder | do. | 920 | do. | medium-strong |
| Broad shoulder | do. | 885 | do. | weak-medium |
| Broad shoulder | do. | 815 | do. | weak |

EXAMPLE 5

244 parts of a 78 percent strength aqueous THPC solution (1 mol), 37.5 parts of methylcarbamate (0.5 mol) and 84.6 parts of a 35.4 percent strength aqueous solution of formaldehyde (1 mol) are condensed for 2 hours at 100°–105° C internal temperature, in a stirred vessel of 500 parts by volume capacity, which is equipped with a reflux condenser and thermometer. 366 parts of a colourless mobile solution of the condensation product are obtained. The phosphorus content of this solution is 8.45 percent. The infra-red spectrum of this product shows the following bands:

| | | | | |
|---|---|---|---|---|
| Broad | band at approx. | 3,240 | cm$^{-1}$ | strong |
| Broad shoulder | do. | 2,990 | do. | weak |
| Sharp | do. | 2,920 | do. | weak |
| Broad shoulder | do. | 2,850 | do. | medium |
| Broad shoulder | do. | 2,650 | do. | weak-medium |
| Broad shoulder | do. | 2,470 | do. | weak |
| Broad shoulder | do. | 2,370 | do. | weak |
| Broad | do. | 2,070 | do. | weak |
| Broad | band at approx. | 1,705 | cm$^{-1}$ | strong |
| Broad shoulder | do. | 1,640 | do. | weak-medium |
| Broad | do. | 1,525 | do. | weak-medium |
| Broad shoulder | do. | 1,450 | do. | weak-medium |
| Broad | do. | 1,410 | do. | medium |
| Broad shoulder | do. | 1,300 | do. | medium |
| Broad shoulder | do. | 1,270 | do. | weak-medium |
| Broad | do. | 1,205 | do. | weak-medium |
| Broad shoulder | do. | 1,110 | do. | weak |
| Broad | do. | 1,040 | do | medium-strong |
| Broad shoulder | do. | 915 | do. | medium |
| Broad shoulder | do. | 885 | do. | medium |
| Broad shoulder | do. | 820 | do. | weak |
| Sharp | do. | 775 | do. | weak |

EXAMPLE 6

244 parts of a 78 percent strength aqueous THPC solution (1 mol) are cooled to 10° C in a stirred vessel of 500 parts by volume capacity which is equipped with a reflux condenser and thermometer, and are neutralised to $p_H$ 7.2 by slowly adding 46.6 parts of 30 percent strength aqueous sodium hydroxide solution whilst stirring rapidly. Thereafter 75 parts (1 mol) of methylcarbamate are added and condensation is carried out for 2 hours at 100°–105° C. After cooling, 361 parts of a yellowish mobile solution of the condensation product are obtained. The phosphorus content of this solution is 8.6 percent. The infra-red spectrum of this product shows the following bands:

| | | | | |
|---|---|---|---|---|
| Broad | band at approx. | 3,240 | cm$^{-1}$ | strong |
| Broad shoulder | do. | 2,970 | do. | weak |
| Broad shoulder | do. | 2,910 | do. | weak |
| Broad shoulder | do. | 2,850 | do. | medium |
| Broad shoulder | do. | 2,620 | do | weak-medium |
| Broad shoulder | do. | 2,470 | do. | weak |
| Broad shoulder | do. | 2,350 | do. | weak |
| Broad | do. | 2,070 | do | weak-medium |
| Broad | do. | 1,690 | do. | strong |
| Sharp shoulder | do. | 1,630 | do. | medium |
| Broad shoulder | do. | 1,520 | do. | medium |
| Broad shoulder | do. | 1,450 | do. | weak |
| Broad shoulder | do. | 1,390 | do. | weak-medium |
| Broad shoulder | do. | 1,280 | do. | weak-medium |
| Broad shoulder | do. | 1,235 | do. | weak |
| Broad shoulder | do. | 1,185 | do. | weak |
| Broad shoulder | do. | 1,155 | do. | weak |
| Broad | do. | 1,100 | do. | weak |
| Broad | do. | 1,030 | do. | medium |
| Broad shoulder | do. | 1,965 | do. | weak |
| Broad | do. | 870 | do. | medium |
| Sharp | do. | 760 | do. | medium |

EXAMPLE 7

244 parts of a 78 percent strength aqueous solution of THPC (1 mol) and 23 parts (0.1 mol) of β, β', β''-nitrilo-tris-propionic acid amide are mixed with 10 parts of 37 percent strength aqueous hydrochloric acid in a stirred vessel of 500 parts by volume capacity which is equipped with a reflux condenser and thermometer, and the mixture is condensed for 2 hours at 100° – 110° C internal temperature. After cooling, 275 parts of a yellowish mobile solution of the condensation product are obtained. The phosphorus content of this solution is 11.3 percent. The infra-red spectrum of this product shows the following bands:

| | | | | |
|---|---|---|---|---|
| Broad | band at approx | 3,240 | cm⁻¹ | strong |
| Broad shoulder | do. | 2,980 | do. | weak |
| Broad shoulder | do. | 2,920 | do. | weak |
| Broad shoulder | do. | 2,850 | do. | weak-medium |
| Broad shoulder | do. | 2,620 | do. | weak-medium |
| Broad shoulder | do. | 2,480 | do. | weak |
| Broad shoulder | do. | 2,370 | do. | weak-medium |
| Sharp | do. | 2,070 | do. | weak-medium |
| Broad | do. | 1,715 | do. | strong |
| Broad | do. | 1,655 | do. | medium |
| Broad | do. | 1,540 | do. | weak-medium |
| Broad | do. | 1,410 | do. | medium |
| Broad | do. | 1,290 | do. | weak |
| Broad | do. | 1,190 | do. | weak-medium |
| Broad shoulder | do. | 1,110 | do. | weak |
| Broad | do. | 1,040 | do. | medium |
| Broad shoulder | do. | 985 | do. | weak |
| Broad shoullder | do. | 915 | do. | weak-medium |
| Broad shoulder | do. | 880 | do. | weak |
| Broad shoulder | do. | 815 | do. | weak |

EXAMPLE 8

Mixed fabrics of polyester-cotton (PES/CO) (50:50 and 67:33) are padded with the liquors according to Table 1 below, dried for 30 minutes at about 80° C and subsequently cured for 5 minutes at 150° C.

The fabric is then washed for 5 minutes at 60° C in a liquor which per litre contains 5 ml of hydrogen peroxide (35 percent strength), 3 g of sodium hydroxide solution (30 percent strength) and 1 g of a 25 percent strength aqueous solution of a condensation product of 1 mol of p-tert.-nonylphenol and 9 mols of ethylene oxide. Thereafter the fabric is rinsed and dried. The degree of fixing indicates the amount of the product present on the fibre material after rinsing (relative to the amount originally taken up).

The fabrics are then washed up to 40 times for 45 minutes at 60° C in a domestic washing machine, using a liquor which contains 4 g/l of a domestic detergent (SNV 198,861 wash). The individual fabric samples are then tested for their flameproof character (DIN 53,906 vertical test; ignition time 6 seconds).

The results are summarised in Table 1 below.

Table 1

| Constituent | un-treated | Treated with Liquor | | |
|---|---|---|---|---|
| | | A PES/CO 67:33 | B PES/CO 50:50 | C PES/CO 50:50 |
| Product according to Example 1 | | 550 | 550 | |
| Product according to Example 3 | | — | — | 545 |
| Dimethylolmelamine | | 96.5 | 96.5 | 96.5 |
| pH-Value of the Liquor (adjusted with NaOH) | | 5.5 | 5.5 | 5.4 |
| g of Phosphorus per kg of Fabric | | 63 | 63 | 52 |
| Liquor Uptake, % | | 75 | 75 | 75 |
| Degree of Fixing, % | | 70 | 64 | 64 |
| Flameproof Character | | | | |
| After rinsing Smouldering time (seconds) | burns | 1 | 0 | 0 |
| Tear length (cm) | | 10 | 9 | 11 |
| After 20 washes Smouldering time (seconds) | burns | 0 | 0 | 0 |
| Tear length (cm) | | 5 | 9 | 8.5 |
| After 40 washes Smouldering time (seconds) | burns | 0 | 0 | 0 |
| Tear length (cm) | | 10 | 9.5 | 9 |

EXAMPLE 9

In the same way as indicated in Example 8, mixed fabrics of polyester-cotton, 50:50 and 67:33, are finished with a liquor according to the table which follows, rinsed, washed up to 20 times and tested.

The results are summarised in Table 2 below.

Table 2

| Constituent | un-treated | Treated with Liquor | |
|---|---|---|---|
| | | PES/CO 50:50 | PES/CO 67:33 |
| Product according to Example 2, g/l | | 500 | 500 |
| Dimethylolmelamine, g/l | | 96.5 | 96.5 |
| pH-Value of the Liquor (adjusted with NaOH) | | 5.4 | 5 |
| g of Phosphorus per kg of Fabric | | 52 | 52 |
| Liquor Uptake, % | | 75 | 75 |
| Degree of Fixing, % | | 72 | 72 |
| Flameproof Character | | | |
| After rinsing Smouldering time (seconds) | burns | 0 | 3 |
| Tear length (cm) | | 9.5 | 10 |
| After 20 washes Smouldering time (seconds) | burns | 0 | 0 |
| Tear length (cm) | | 10 | 10.5 |

EXAMPLE 10

In the same way as indicated in Example 8, a mixed fabric of polyester-cotton, 67:33, is finished with a liquor according to the table which follows, rinsed, washed 5 and 10 times and tested.

The results are summarised in Table 3 below.

EXAMPLE 11

In the same way as indicated in Example 8, mixed fabrics of polyester-cotton (PES/CO), 50:50, and cotton fabrics are finished with a liquor according to Table 4 below, rinsed, washed up to 20 times and tested. The liquor uptake for PES/CO is 70 percent and for CO it is 80 percent.

The cotton fabric is rinsed in a bath which contains 4 g/l of sodium carbonate and 1 g/l of a condensation product of 1 mol of p-tert.-nonylphenol and 9 mols of ethylene oxide, at the boil. The subsequent wash also takes place at the boil in the case of the cotton fabric.

The results are summarised in Table 4 below.

Table 4

| Constituents, g/l | Un-treated | PES/CO 50:50 A | B | C | D | E | CO F | G |
|---|---|---|---|---|---|---|---|---|
| Product according to Example 4 | | 465 | 465 | | | | | |
| 5 | | | | 965 | 965 | | | |
| 6 | | | | | | 950 | | 510 |
| 7 | | | | | | | 720 | |
| Di-Trimethylolmelamine | | 103 | | 103 | 103 | 103 | 103 | 120 |
| Trimethylolmelamine-dimethyl-ether (75% strength) | | | 153 | | | | | |
| Silicone oil emulsion (40% strength) | | 35 | 35 | 35 | 35 | 35 | 35 | 35 |
| pH-Value of the Bath | | 5.5 | 5.5 | 4.5 | 6.5* | 7* | 5.5 | 7* |
| g of Phosphorus per kg of Fabric | | 57 | 57 | 57 | 57 | 57 | 57 | 35 |
| Degree of Fixing, % | | 46 | 62 | 65 | 67 | 67 | 60 | 68 |
| Flameproof Character: Smouldering time (seconds)/tear length (cm) | | | | | | | | |
| | un-treated | A | B | C | D | E | F | G |
| After rinsing | burns | 1/12 | 1/10.5 | 0/10 | 0/8.5 | 0/9.5 | 0/8.5 | 0/7 |
| After 1 wash | burns | 0/8.5 | 1/10 | 0/8.5 | 0/8 | 0/8.5 | 0/6.5 | 0/5 |
| After 5 washes | burns | 1/8.5 | 1/10.5 | 0/10 | 0/7 | 0/6 | 1/7.5 | 0/8 |
| After 20 washes | burns | 1/9 | 1/8.5 | 1/7.5 | 0/9 | 0/6.5 | 2/9.5 | 0/5 |

* Product converted into hydroxy compound.

Table 3

| Constituent | Un-treated | Treated with Liquor |
|---|---|---|
| Product according to Example 3, g/l | | 545 |
| Dimethylolmelamine, g/l | | 96 |
| pH-Value of the Liquor (adjusted with NaOH) | | 5 |
| g of Phosphorus per kg of Fabric | | 52 |
| Liquor Uptake, % | | 75 |
| Degree of Fixing, % | | 62 |
| Flameproof Character | | |
| After rinsing Smouldering time (seconds) Tear length (cm) | burns | 0 11 |
| After 5 washes Smouldering time (seconds) Tear length (cm) | burns | 0 9 |
| After 10 washes Smouldering time (seconds) Tear length (cm) | burns | 0 8 |

EXAMPLE 12

In the same way as indicated in Example 8, mixed fabrics of polyester-cotton (PES/CO), 67:33, and woollen fabrics (W), are finished with a liquor according to Table 5 below, rinsed, washed up to 5 times and tested. The liquor uptake is 70 percent for PES/CO and 80 percent for wool.

The wool fabric is rinsed in a bath which contains 4 g/l of sodium carbonate and 1 g/l of a condensation product of 1 mol of p-tert.-nonylphenol and 9 mols of ethylene oxide, at 40° C. The subsequent wash is also carried out at 40° C in the case of the wool fabric.

The results are summarised in Table 5.

EXAMPLE 13

Mixed fabrics of polyester/cotton, 50:50 and 67:33, are padded with the following liquor:
  465 g/l of a product according to Example 4
  103 g/l of di-trimethylolmelamine
  35 g/l of silicone oil emulsion (40 percent strength)

The pH-value of the liquor is 4.5, the liquor uptake is 70 percent and the amount of phosphorus is 57 g/kg of fabric.

The fabrics are finished by the ammonia fixing process:

After padding, the fabrics are dried incompletely and gassed for 10 minutes with ammonia. They are then treated for 10 minutes in a bath which contains 300 ml/l of a 24 percent strength aqueous ammonia solu- Table 5

| Constituents, g/l | Fabric treated with | | | | |
|---|---|---|---|---|---|
| | PES/CO | | | W | Untreated |
| | A | B | C | D | |
| Product according to Example | | | | | |
| 5 | 965 | 965 | | | |
| 6 | | | 950 | 780 | |
| Di-Trimethylolmelamine | 103 | 103 | 103 | 84.5 | |
| Silicone oil emulsion (40% strength) | 35 | 35 | 35 | 35 | |
| pH-Value of the Bath | 4.5 | 6.5* | 7* | 7* | |
| g of Phosphorus/kg of Fabric | 57 | 57 | 57 | 54 | |
| Degree of Fixing, % | 66 | 56 | 67 | 64 | |
| Flameproof Character: Smouldering time (seconds)/tear length (cm) | | | | | |
| After rinsing | 0/12 | 0/10.5 | 0/9.5 | 1/4.5 | burns |
| After 1 wash | 2/11 | 1/10 | 2/10 | 3/5.5 | burns |
| After 5 washes | 0/11.5 | 0/10.5 | 3/11 | 1.5/9.5 | burns |

*Product convertered into hydroxy compound.

tion and subsequently washed at 40° C in a bath which contains 5 g/l of soap and 6 ml/l of H₂O₂ (35 percent strength), rinsed and dried. Thereafter the fabrics are washed up to 20 times in the same way as indicated in Example 8.

The results are summarised in Table 6 below.

Table 6

| Flameproof Character | Untreated | PES/CO 50:50 | | PES/CO 67:33 | |
|---|---|---|---|---|---|
| | | burning time (secs.) | tear length (cm) | burning time (secs.) | tear length (cm) |
| After rinsing | burns | 0 | 7.5 | 1 | 11 |
| After 1 wash | burns | 0 | 9 | 0 | 10.5 |
| After 5 washes | burns | 0 | 8 | 1 | 10.5 |
| After 20 washes | burns | 0 | 8.5 | 2 | 9.5 |

We claim:
1. A process for flameproofing mixed polyester-cellulose fiber material, comprising the sequential steps of treating the material with an aqueous preparation which consists essentially of (1) a water-soluble condensation product obtained by condensing a tetrakis-(hydroxymethyl)-phosphonium compound at 40° to 120° C with 0.02 to 1.0 molar equivalent of a compound of the formula:

$$R-CONH_2$$

wherein R denotes alkoxy with 1 to 4 carbon atoms, hydroxyalkoxy with 2 to 4 carbon atoms, aminocarbonyl or a radical of the formula $$(H_2N - CO - CH_2CH_2)_2 - Z - CH_2CH_2 -$$

wherein Z represents

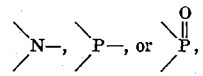

and (2) a polyfunctional aminoplast precondensate, and curing the treated material.

2. The process of claim 1, wherein the tetrakis-(hydroxymethyl)-phosphonium compound is a tetrakis-(hydroxymethyl)-phosphonium salt, the aminoplast precondensate is a methylolmelamine, and the curing step is effected by heating the treated material for about 30 seconds to about 10 minutes, at a temperature in the range of about 100° to 200° C after a drying step.

3. The process of claim 1, wherein the condensation product is obtained by condensing a tetrakis-(hydroxymethyl)-phosphonium compound with a R—CONH₂ compound in the presence of an inert organic solvent.

4. The process of claim 1, wherein the molar equivalent of the R—CONH₂ compound is in the range of 0.1 to 0.6.

5. The process of claim 1, wherein the tetrakis-(hydroxymethyl)-phosphonium compound is a tetrakis-(hydroxymethyl)-phosphonium salt or tetrakis-(hydroxymethyl)-phosphonium hydroxide.

6. The process of claim 1, wherein the R—CONH₂ is methylolated before the condensation.

7. The process of claim 1, wherein R is alkoxy with 1 to 4 carbon atoms, hydroxyalkoxy with 2 to 4 carbon atoms or aminocarbonyl.

8. The process of claim 1, wherein the condensation is carried out in the presence of formaldehyde.

9. The process of claim 1, wherein the condensation product is at least partially etherified with an alkanol of 1 to 4 carbon atoms.

10. The process of claim 1, wherein the condensation product is obtained by further condensation at a temperature of 100° to 150° C.

11. The process of claim 3, wherein the inert organic solvent includes an aromatic hydrocarbon.

12. The process of claim 5, wherein the tetrakis-(hydroxymethyl)-phosphonium salt is a tetrakis-(hydroxymethyl)-phosphonium halide.

13. The process of claim 7, wherein the R-CONH$_2$ compound is methylolated before the condensation.

14. The process of claim 7, wherein R is methoxy, ethoxy, 2-hydroxyethyl or aminocarbonyl.

15. Mixed polyester-cellulose fiber material which has been provided with a flameproofing finish by a process comprising the sequential steps of treating the material with an aqueous preparation which consists essentially of (1) a water-soluble condensation product obtained by condensing a tetrakis-(hydroxymethyl)-phosphonium compound at 40° to 120° C with 0.02 to 1.0 molar equivalent of a compound of the formula:

R—CONH$_2$ wherein R denotes alkoxy with 1 to 4 carbon atoms, hydroxyalkoxy with 2 4 carbon atoms, aminocarbonyl or a radical of the formula (H$_2$N — CO — CH$_2$CH$_2$)$_2$—Z — CH$_2$CH$_2$ — wherein Z represents

and (2) a polyfunctional aminoplast precondensate, and curing the treated material.

16. The mixed polyester-cellulose fiber material of claim 15, wherein the tetrakis-(hydroxymethyl)-phosphonium compound is a tetrakis-(hydroxymethyl)-phosphonium salt, the aminoplast precondensate is a methylolmelamine, and the curing step is effected by heating the treated material for about 30 seconds to about 10 minutes, at a temperature in the range of about 100° to 200° C after a drying step.

17. The mixed polyester-cellulose fiber material of claim 16 wherien R is methoxy, ethoxy, 2-hydroxyethyl or aminocarbonyl.

* * * * *

UNITED STATES PATENT AND TRADEMARK OFFICE
CERTIFICATE OF CORRECTION

PATENT NO. : 3,874,911
DATED : April 1, 1975
INVENTOR(S) : HERMANN NACHBUR ET AL It is certified that error appears in the above—identified patent and that said Letters Patent are hereby corrected as shown below:

Column 15, claim 15, line 16, delete "24" and substitute --- 2 to 4 ---.

Column 16, claim 17, line 17, delete "wherien" and substitute --- wherein ---.

Signed and Sealed this thirtieth Day of March 1976

[SEAL]

Attest:

RUTH C. MASON
Attesting Officer

C. MARSHALL DANN
Commissioner of Patents and Trademarks